United States Patent [19]

Akahori et al.

[11] Patent Number: 5,764,956

[45] Date of Patent: Jun. 9, 1998

[54] COMPUTER PERIPHERAL FUNCTION EMULATOR

[75] Inventors: Yutaka Akahori; Hideaki Ogata; Yasushi Nakaoka; Masanori Kojima, all of Nagano-ken, Japan

[73] Assignee: Seiko Epson Conporation, Tokyo, Japan

[21] Appl. No.: 554,780

[22] Filed: Nov. 7, 1995

[30] Foreign Application Priority Data

Nov. 7, 1994 [JP] Japan .................................. 6-298967

[51] Int. Cl.⁶ .................................................. G06F 9/455
[52] U.S. Cl. .................................................. 395/500; 395/527
[58] Field of Search .................................. 395/500, 800; 364/578

[56] References Cited

U.S. PATENT DOCUMENTS

| | | | |
|---|---|---|---|
| 5,077,657 | 12/1991 | Cooper et al. | 395/500 |
| 5,261,079 | 11/1993 | Celi, Jr. | 395/500 |
| 5,347,647 | 9/1994 | Allt et al. | 395/575 |
| 5,551,013 | 8/1996 | Beausoleil et al. | 395/500 |
| 5,574,927 | 11/1996 | Scantlin | 395/800 |

FOREIGN PATENT DOCUMENTS 546306  2/1993  Japan .

*Primary Examiner*—Kevin J. Teska
*Assistant Examiner*—Dan Fiul
*Attorney, Agent, or Firm*—Loeb & Loeb LLP

[57] ABSTRACT

An emulator that emulates the operation of a target machine on an execution machine is disclosed. The execution module prepared for each function of the target machine is called via a dispatcher from a kernel. A calling address is registered in a dispatcher table by the execution module when each execution module is loaded. Inputs from a keyboard causes a hardware interrupt resulting in the calling of a keyboard emulator. After a converted key code is stored in a buffer, an interrupt controller emulator is called by intermodule communication. The interrupt controller emulator requests a virtual interrupt for the kernel. The keyboard emulator is called again and the key code stored in the buffer is transmitted to the application program.

20 Claims, 17 Drawing Sheets

COMPUTER PERIPHERAL FUNCTION EMULATOR

BACKGROUND

1. Field of the Invention

The present invention relates to an emulator, and more specifically to an emulator which executes programs of a target machine on an executing machine. The target machine is a computer having an instruction set compatible with the instruction set executed by the arithmetic processing unit of the execution machine and having an architecture that differs from that of the execution machine. The execution machine is a computer equipped with at least an arithmetic processing unit, a memory unit, and an I/O unit.

2. Prior Art

Previously, a virtual computer emulator that individually emulates the operating system function calls of the target machine, basic input/output system (BIOS) function calls, I/O instructions, and an interrupt table as described in Japanese Laid-Open Patent No. 5-46406, and can execute applications written for the target machine is well known.

In this kind of emulator, the functions provided in a specific central processing unit (CPU) are used. The kind of processing to be executed on the target machine is analyzed when instructions that should be emulated are executed and trapped, and the address and I/O that should be emulated are accessed; and alternate processes; prepared in advance to obtain similar results on the execution machine are executed. For example, when the instruction that accesses the I/O address allocated for a specific function in the target machine is to be executed, it is trapped as the processing of a privileged instruction. The function to be performed is analyzed. Then, the write processing to the I/O address of the execution machine, that will perform similar processing, is executed.

However, in a conventional emulator, because perfectly emulating some target machines on an execution machine makes the emulation program enormous, actual implementation is problematic. Consequently, in a typical emulator, only a certain range of the function calls defined by the operating system and the most often used I/O accesses (for example, directly accessing a V-RAM) are emulated.

In addition, to simplify the emulation, functions composed of a series of processes, such as disk access or drawing instructions, are usually emulated as a unit. In this case, if the application software directly executes each process that forms each function, normal emulation cannot be performed.

The architectures of any target or execution machine are burdened by the history of their development or their limitations during development. Having a simple, clear construction from beginning to end is expected to be difficult. When the details are examined, various exceptions and additional functions are present but they are not at all possible in a simple emulation. Therefore, when all processes and functions forming the machine are implemented in a complete emulation, the structure of the emulator becomes complex, and the emulation program also becomes complex and large.

SUMMARY

An objective of a preferred embodiment is to emulate a large part of the architecture of some target machines on another execution machine and it adopts the following structure.

Briefly, a preferred embodiment of the present invention is directed to an emulator for executing on an execution machine, which is a computer equipped with at least an arithmetic processing unit, a memory unit, and an input/output (I/O) unit, to execute programs for a target machine, which is a computer having an instruction set compatible with the one executed by said arithmetic processing unit and having an architecture that differs from the architecture of said execution machine. The emulator includes multiple execution modules where for every function determined by said architecture of said target machine, an equivalent process of said function is executed on said execution machine; an initialization means for loading said execution modules and recording the calling information for calling said execution modules before activating the emulation; a detection means for detecting when said program at least belongs to the processing related to said target machine when said program is executed on said execution machine; a discrimination means for discriminating the functions of said target machines where said program belongs when detected by said detection means; and a calling means which uses said registered calling information to call the execution module prepared for each of said functions corresponding to said discriminated function.

The preferred embodiment as set forth above has an initialization stage that loads multiple execution modules the execution machine when enabled, and registers calling information for calling the execution modules. When processing is initiated and a target machine program is executed in the execution machine, the detection means detects when a program that is to be executed on the target machine. When such a program is detected by the detection means, the discrimination means discriminates the target machine functions belonging to the program. In response to the discriminated functions, the calling means uses the registered calling information to call an execution module prepared for each function. Here, the execution machine and target machine have different architectures, but the instruction sets executed by the arithmetic processing units are compatible. Consequently, instructions that do not belong to processes associated with the target machine can be executed unaltered. Instructions related to processes associated with the target machine are executed as equivalent processes by the execution module called by using the preregistered calling information.

The initialization stage can be constructed to perform the registration of calling information for calling the execution module in each execution module itself, and to transfer temporary processing information to the execution of a specific processing program prepared in the execution module. When the execution module itself is registered, the initialization stage does not have to monitor the calling information that should be registered, or information such as which execution modules are registered.

In addition, at least one of the execution modules stores the calling information registered by another execution module. During the execution of the execution module, this calling information is used by a calling means to indirectly call another execution module (however, it does not call a detection means or a discrimination means). This construction is helpful in improving the overall execution speed.

Furthermore, when the execution modules are loaded by the initialization stage, at least one of the execution modules can get direct calling information for directly calling at least one of the processes prepared inside another loaded execution module to construct yet another execution module. In this case, an execution module loaded later uses the direct calling information fetched when this execution module is executed and can directly call another previously loaded execution module. An execution module to be loaded later is used internally in another execution module loaded earlier. If the direct calling information that directly calls at least one of the processes constructing this execution module is indicated, the execution module loaded in advance can similarly call the execution module to be loaded later.

In addition, at least one of the execution modules is a module for executing a process equivalent to the process accompanying a hardware interrupt of the target machine. When this module sends direct calling information to another execution, this other execution module processes the originator of the interrupt. During its registration, this execution module is suitable for registering the information specific to interrupts for the other execution modules, and improves the processing during the occurrence of interrupts.

Although an execution module can be completely configured by software, the execution modules and calling means of at least one part of multiple execution modules are loaded on the execution machine and are implemented on a machine equipped with an arithmetic processing unit that differs from the arithmetic processing unit of the execution machine and is suitable for improving the execution speed.

One of these execution modules is a module for executing a process equivalent to transmitting data between the I/O devices, such as a keyboard or mouse, of the target machine. This module is called in conjunction with the operation of the I/O devices such as the execution machine's keyboard. This module is called by the interrupt generated when data is transmitted. After transmitting the data, the transmission is simulated on the target machine. This module is the mechanism for exchanging data transmitted previously with the exterior as data of an I/O device in the target machine. If this module is called twice during the operation of the I/O devices of the execution machine, the I/O device functions can be simulated with more accuracy.

DETAILED DESCRIPTION

Figure 1:
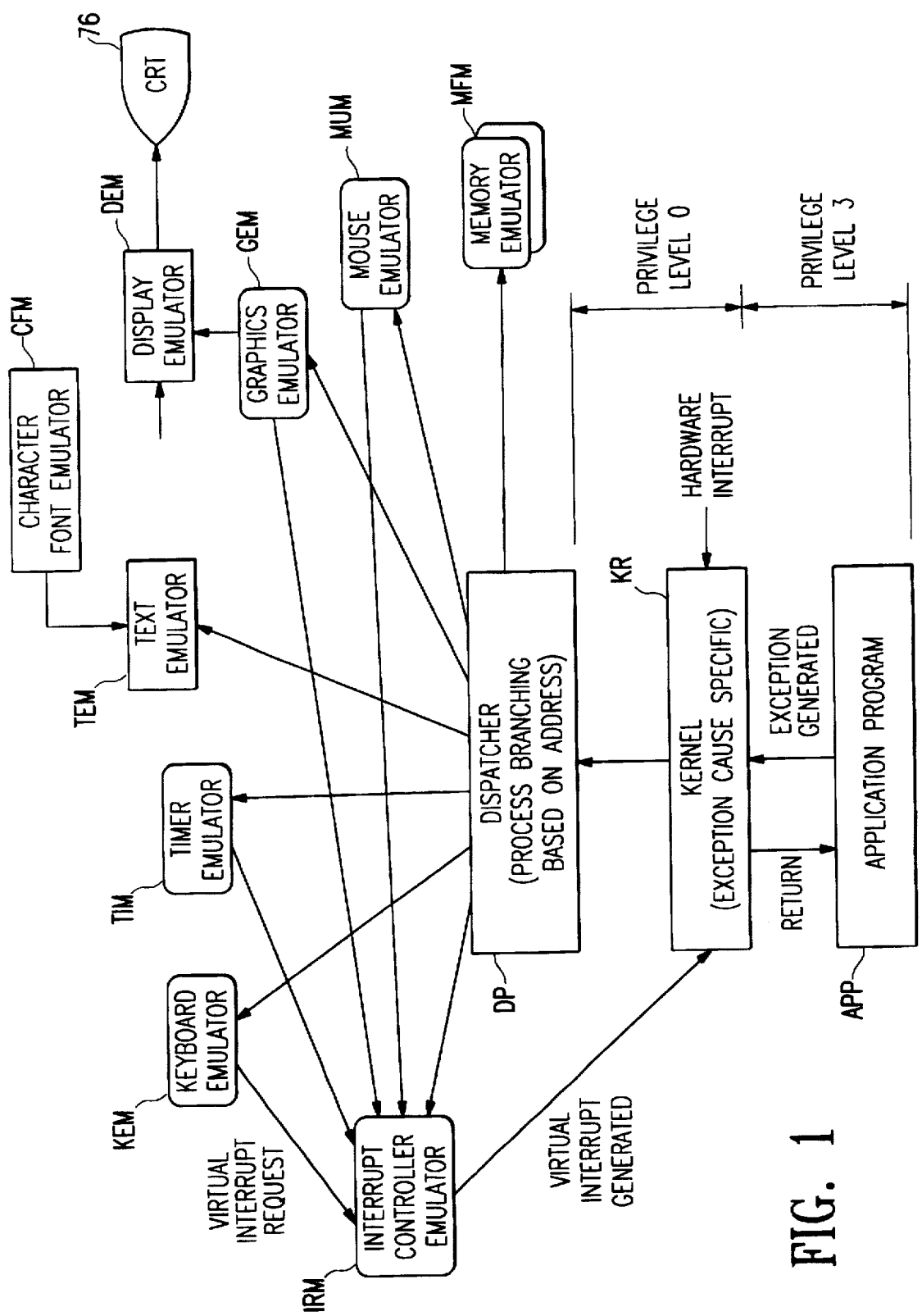
FIG. 1 shows a block diagram of the overall structure of the emulator that is one embodiment of the present invention.
Figure 2:
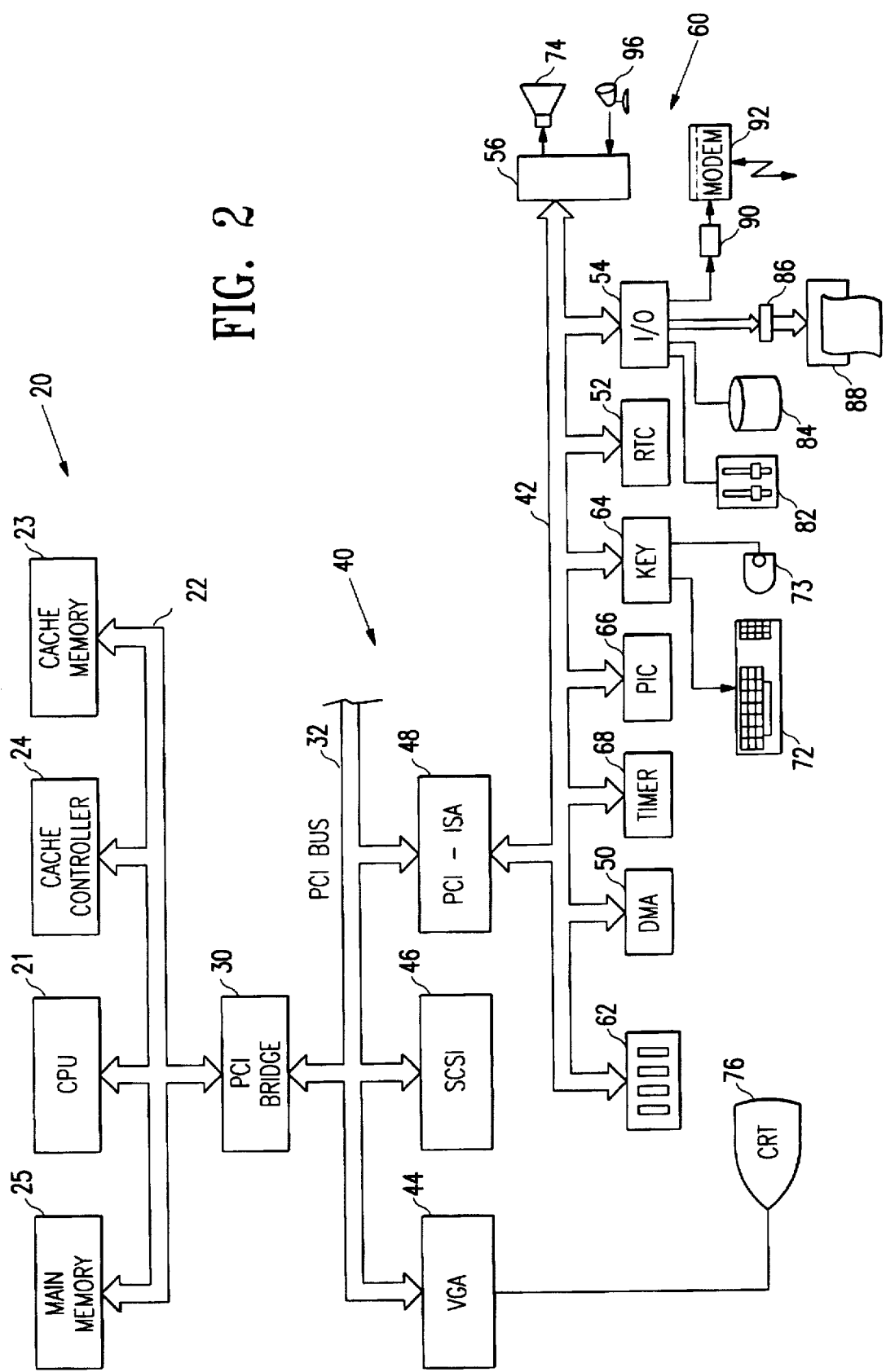
FIG. 2 shows a diagram of the DOS/V machine that may be the execution machine.
Figure 3:
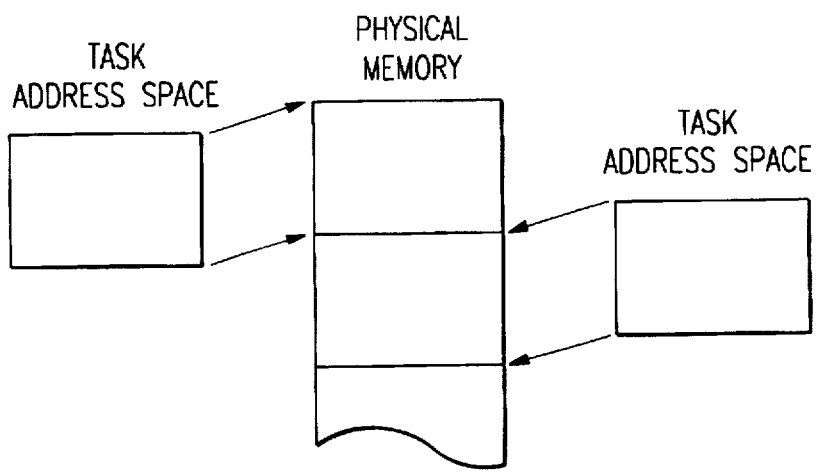
FIG. 3 shows a diagram of the relationship of the task address and the physical memory.

To explain the structure and operation of the preferred embodiments, a suitable embodiment of the present invention is described next. FIG. 1 is a block diagram showing the overall structure of an embodiment. This emulator may be hosted on a DOS/V machine (PC-AT and DOS/V are trademarks of IBM Corporation) which is compatible with the PC-AT machine as the execution machine and implements the architecture of the PC-9800 Series (PC-9800 is a trademark of NEC Corporation). FIG. 2 is a block diagram showing the overall structure of a DOS/V machine. FIG. 3 is a schematic diagram showing its memory and I/O maps.

To aid in the explanation, the structure of the DOS/V machine, which may be the execution machine, is described with reference to FIG. 2. As shown in this figure, this DOS/V machine includes an arithmetic processing unit 20 connected to a local bus, a PCI bridge 30 connected to the PCI bus where the local bus 22 is one of the external buses; a controller 40 that is accessed by the CPU 21 of the arithmetic processing unit 20 via the PCI bus 32; an I/O unit 60 which is the device for controlling various I/O devices connected to the ISA bus 42 that is a low-speed external bus; and a keyboard 72, a speaker 74, and a CRT 76 which are peripheral devices.

The arithmetic processing unit 20 includes the CPU 21 as the central processing unit (Intel Corporation's Pentium may be used in this embodiment), the cache memory 23, the cache controller 24, and the main memory 25. The PCI bridge 30 is a controller equipped with functions for controlling the high-speed PCI bus 32. The memory space managed by the CPU 21 is extended by a logical address which is greater than the actual physical address and achieved by using various registers provided in the CPU 21.

The controller 40 includes of a graphics controller (VGA) 44 that controls the image display on the monitor (CRT) 76, a SCSI controller 46 that controls data transfer with connected SCSI devices, and a PCI-ISA bridge 48 that controls the interface with the PCI bus 32 and the lower ISA bus. VGA 44 can support the display of 640×480 dots in 16 colors on the CRT 76. A character generator storing the display fonts, a graphics controller that receives special commands and draws specific figures, and a video memory for storing the drawn images are implemented in this VGA 44. However, since these structures are well known, they are omitted from FIG. 2 and will be explained later.

The ISA bus 42 connected via the PCI-ISA bridge 48 is the bus used for I/O control that connects various I/O devices. It includes a DMA controller (DMA) 50, a real-time clock (RTC) 52, a combined I/O board 54, a sound I/O 56, a keyboard interface (KEY) 64 for controlling the interfaces of the keyboard 27 and mouse 73, an interrupt controller (PIC) 66 for handling priority interrupts, and a timer 68 that generates the various time counts and beeping sounds. The ISA slot 62 where expansion boards can be mounted is connected to the ISA bus 42.

In addition to parallel output and serial output in the combined I/O port 54, ports are provided for the input and output of the signals controlling the floppy disk drive 82 and hard disk 84. In addition, the printer 8 is connected to the parallel I/O via the parallel port 86. The modem 92 is connected to serial I/O via the serial port 90. In addition to the aforementioned speaker 74, a microphone 96 can be connected to the sound I/O 56. In addition to these structures, standardized I/O channels are often provided on the DOS/V machine, but they are omitted from the diagrams and explanation in this embodiment.

Figure 4:
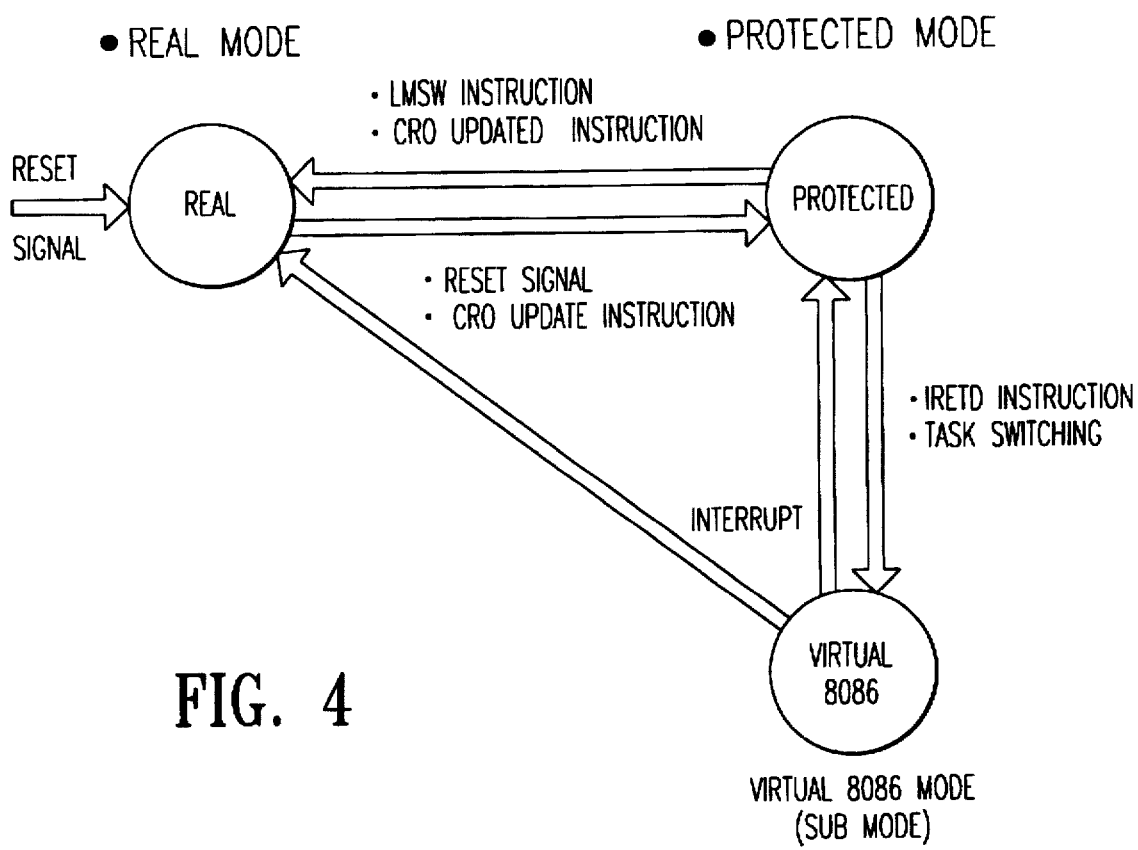
FIG. 4 shows a diagram of the relationship between the execution mode and its switches.

The method for implementing the PC-9800 machine's architecture on a DOS/V machine having this structure is described below. First, the memory management function available in the CPU 21 of the DOS/V machine, which is the execution machine in this embodiment, and its execution modes are explained. FIG. 3 is a schematic illustrating the relationship between the address space for managing tasks and physical addresses. FIG. 4 is a diagram showing the relationships between the real mode, protected mode, and virtual 8086 mode. The i80386 (manufactured by Intel Corporation) and later CPUs have functions that can allocate the address managing the tasks to specific physical addresses, and be processed at specific logical addresses in the task. Consequently, when processing moves to each task, even when a specific address in that task is accessed, it has no effect on the same address of another task.

In addition, this CPU 21 has three operating modes namely, a real mode, a protected mode, and a virtual 86 mode. The real mode is the mode where this CPU 21 operates as a high-speed 8086. When MS-DOS (trademark of Microsoft Corporation) is booted, processing usually starts in the real mode. The protected mode is the operating mode that uses ring protected functions, setting a privilege level. By setting the privilege level in segment units, protection from direct access is implemented by a special process. For example, it is easy to place the privilege level of an application program at the lowest level, and to make direct access by the system to the stipulated address range and I/O impossible. When direct access occurs, exception handling is initiated, a trap is generated, and the process can move to the special address. Furthermore, the virtual 8086 mode is the mode where 8086 code can be directly executed as in the protected mode. The CPU 21 operates as in the protected mode, but the logical addresses set by the application program are interpreted as in the 8086 and executed.

Figure 5:
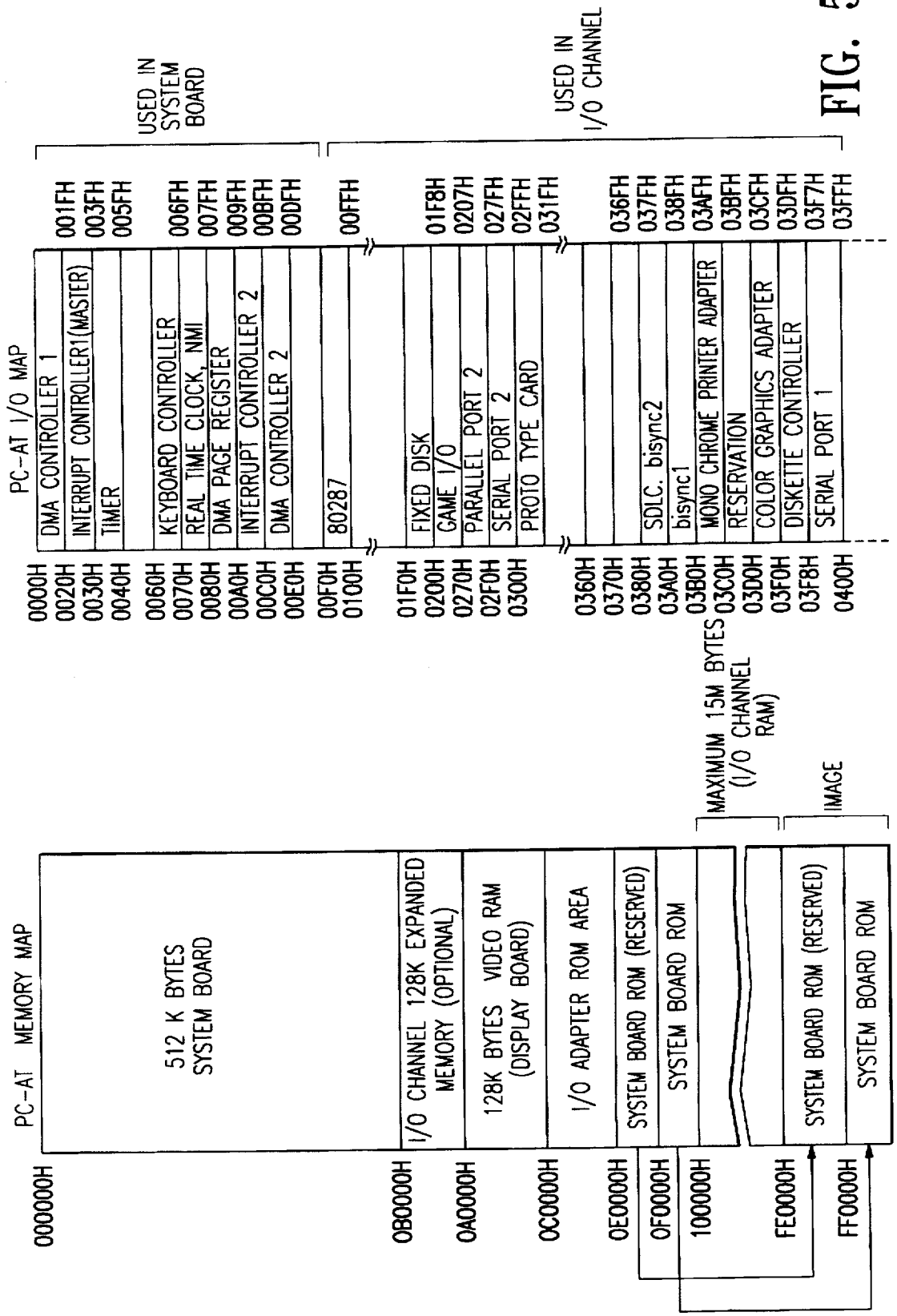
FIG. 5 shows a diagram of the memory map and I/O map immediately after the DOS/V machine is booted.
Figure 6:
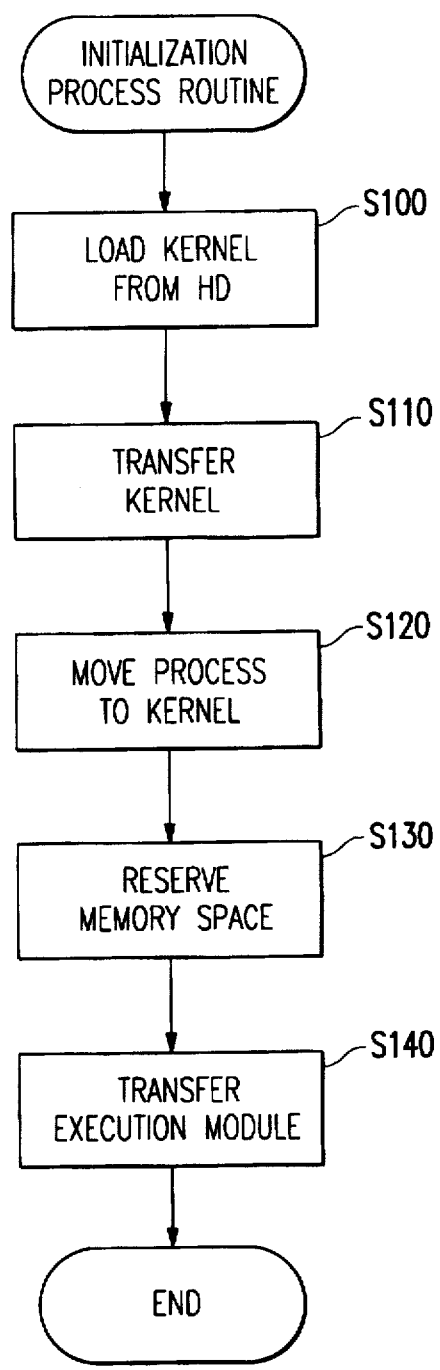
FIG. 6 shows a flowchart of the initialization process routine of the emulator.
Figure 7:
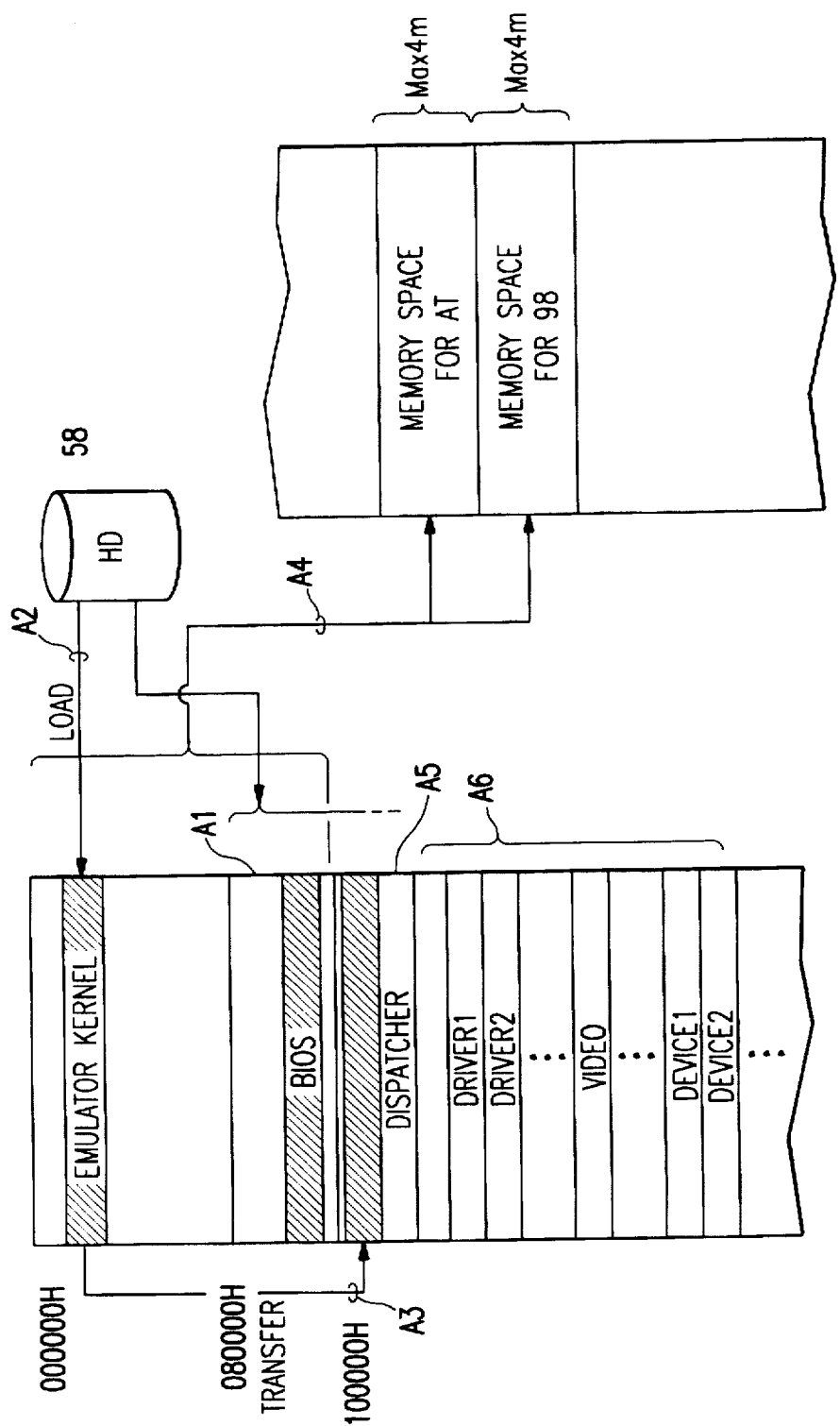
FIG. 7 shows a diagram of the features of the initialization process.

When power is turned on to the DOS/V machine of this embodiment, this DOS/V machine can read the boot block of the hard disk and write the operating system to the hard disk. The BIOS of the DOS/V machine provided in the ROM enters the access-possible state in main memory (reference number A1 in FIG. 7 to be described later). FIG. 5 illustrates the memory map and I/O map of the DOS/V machine. Then, the initialization processing routine, which is in the initialization stage in this embodiment, is executed. FIG. 6 shows this processing routine. FIG. 7 illustrates aspects of the execution of the initialization processing routine in FIG. 6. Next, aspects of initializing the emulator are described while referring to the flowchart in FIG. 6 and the diagram in FIG. 7.

When the initialization processing routine, shown in FIG. 6, is activated, the kernel of the emulation program is loaded from the hard disk 58 (step S100, reference number A2 in FIG. 7). The kernel analyzes the cause of an exception when exception-handling is activated during emulation. The series of procedures that call the execution modules, which actually perform the emulation, are called by a process called the dispatcher. The dispatcher corresponds to the calling means in the emulation process and includes a series of procedures that call the execution modules to perform the actual emulation based on analysis by the kernel. After this kernel is loaded, the kernel is transferred to its execution position (step S110, reference number A3 in FIG. 7), and processing moves to the kernel (step S120). Consequently, the series of processes are shown in FIG. 6, but after step S130, becomes the processing of the kernel itself.

The kernel transfers several programs using the protected mode, switches the operating mode of the CPU 21 to the protected mode, and reserves memory space for DOS/V and memory space for PC-9800 in their respective upper addresses (step S130, reference number A4 in FIG. 7). This memory space is for virtual DOS/V tasks and PC-9800 tasks. Logically, this memory space is allocated as 1M of main memory beginning at 000000H. Next, the dispatcher (reference number A5 in FIG. 7), which operates with the kernel, transfers, in sequence, the various execution modules that will perform the emulation (step S140, reference number A6 in FIG. 7). In addition to the BIOS routines for virtual DOS/V already in the accessible state, execution modules for the emulation are placed in the main memory.

In step S140, the execution modules loaded in sequence into memory are read out from the hard disk 84 in accordance with a list written in text data format in a file having the prescribed name. Next, the initialization process accompanying execution module placement will be explained. The overall structure after the execution modules are all loaded is explained using FIG. 1. When the kernel KR, the dispatcher DP, and each execution module is loaded and initialized, the emulator of the embodiment is implemented on this DOS/V machine as shown in FIG. 1. That is, when the program APP executed in the same environment (called virtual PC) as the PC-9800 machine that was virtually prepared on the DOS/V machine executes special instructions, this emulator is constructed from the kernel KR when an exception occurs, dispatcher DP that is called based on the exception cause set by the kernel KR and calls each execution module prepared for each function based on this exception cause, and various execution modules are called from the dispatcher DP to emulate each function.

The execution modules that actually perform the emulation roughly classify the hardware of the PC-9800 machine based on their functions and are prepared for every function. FIG. 1 only shows the major modules. The memory emulator MEM is the module for emulating the main memory and EMS state. The mouse emulator MUM is the module that emulates the operation of the mouse 73 of the DOS/V machine as the mouse of the PC-9800 machine. The graphics emulator GEM is the module that emulates the graphics screen of the PC-9800 machine. The text emulator TEM is the module that operates in conjunction with the character font emulator CFM which emulates fetching of the character images specified by the character code and emulates the text screen of the PC-9800 machine. After the screen of the virtual PC-9800 machine is emulated by the text emulator TEM and graphics emulator GEM, the display of the screen on the actual CRT 76 is emulated by the display emulator DEM.

The timer emulator TIM is the module that emulates the processes of the timer function on the PC-9800 machine by using the timer 68 built into the DOS/V machine. In addition, the keyboard emulator KEM is the module that emulates the key input from the keyboard of the PC-9800 machine, based on the DOS/V machine's keyboard 72 and KEY 64.

Figure 8:
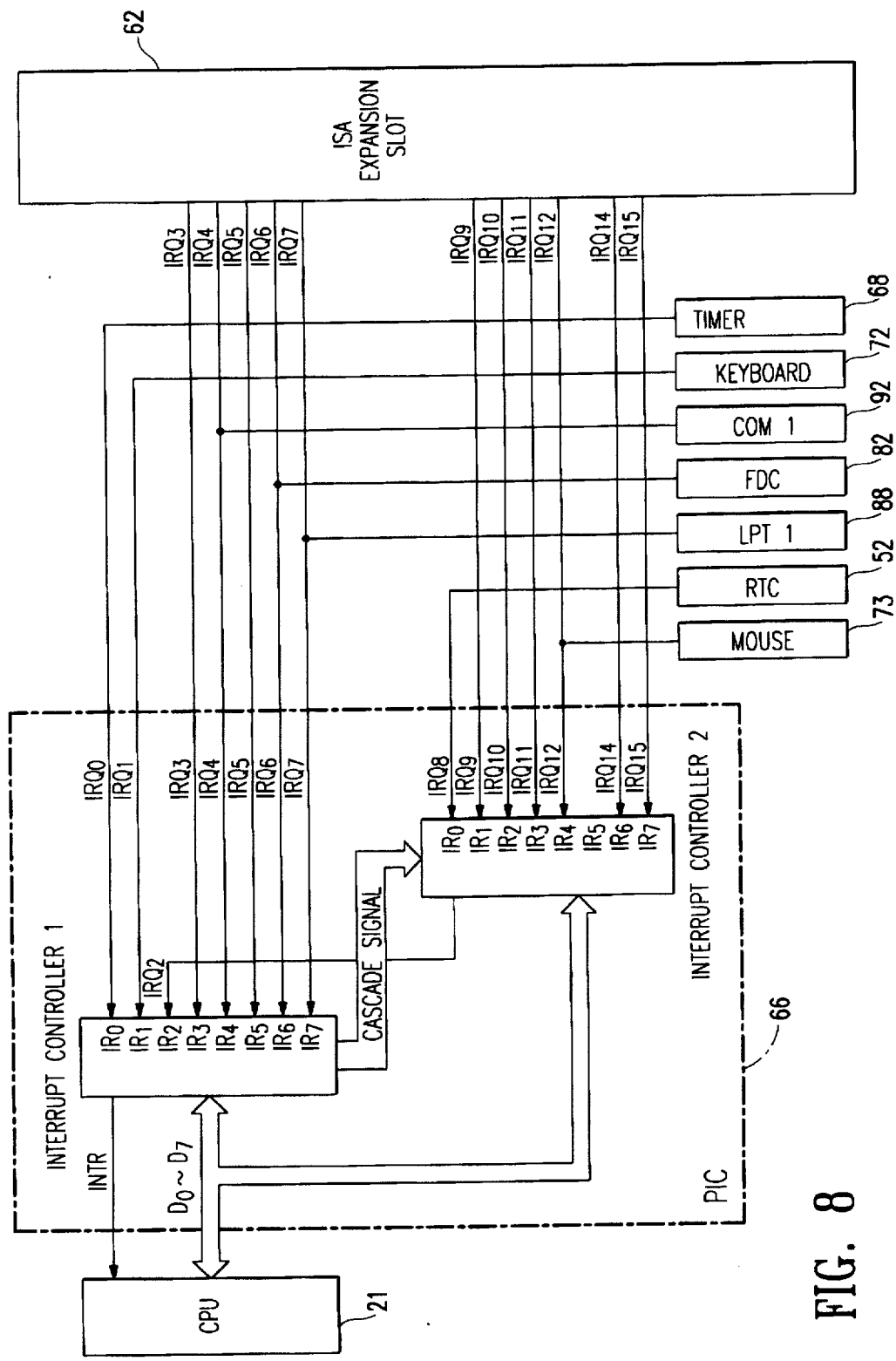
FIG. 8 shows a block diagram of the circuit for interrupts in the DOS/V machine.

Furthermore, the interrupt controller emulator IRM is the module that emulates the PC-9800 machine's interrupts by using the DOS/V machine's interrupts. This interrupt controller emulator IRM receives calls from many modules through the behavior of interrupts. FIG. 8 shows the interrupt processing circuit in the DOS/V machine. While this is also true in the PC-9800 machine, since interrupt requests are output to PIC 66 from many devices, some kinds of exchanges between modules are required, even in the execution modules emulating the request. For convenience, in the diagram in FIG. 8, a portion of the interface circuit was omitted, but the interrupt request is naturally output via a dedicated interface circuit. For example, an interrupt request from the mouse 73 is not output directly, but via the KEY 64, which is the interface circuit.

The implementation of hardware interrupts in a DOS/V machine is handled as one type of exception handling that moves the process to the kernel KR, executes privileged instructions, and writes to the range specified as protected. In addition, as a virtual interrupt occurrence, an interrupt that causes the interrupt controller emulator IRM to emulate the operation of the PC-9800 machine, caused by a hardware interrupt or by the processing in each module, is the main reason for calling the kernel KR. Details on calling the interrupt controller emulator IRM will be described later.

Figure 9:
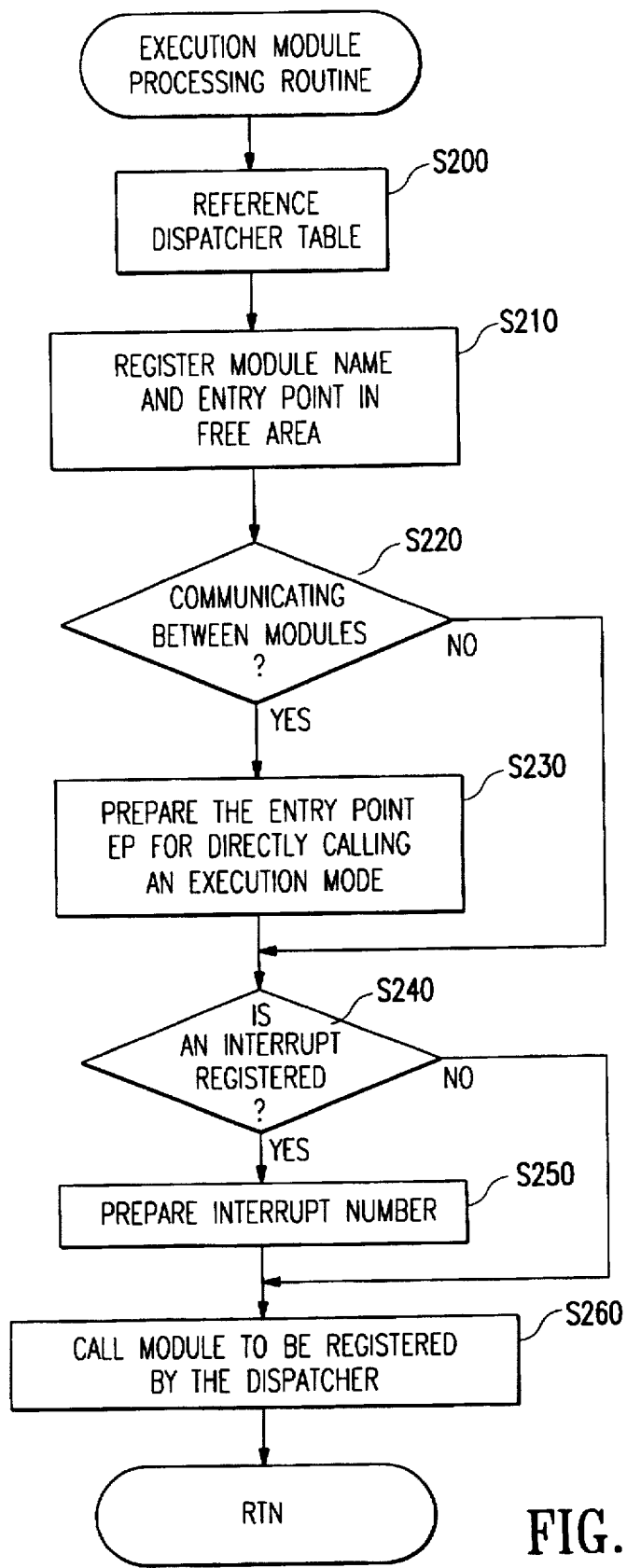
FIG. 9 shows a flowchart of the processing routine when an execution module is loaded.
Figure 10:
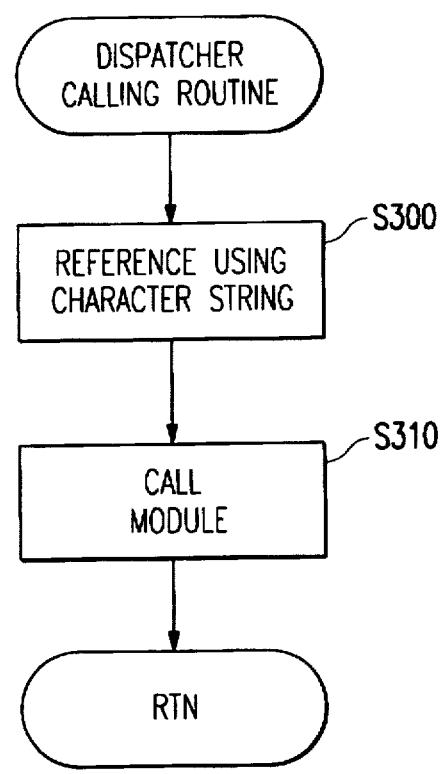
FIG. 10 shows a flowchart of the dispatcher calling routine.
Figure 11:
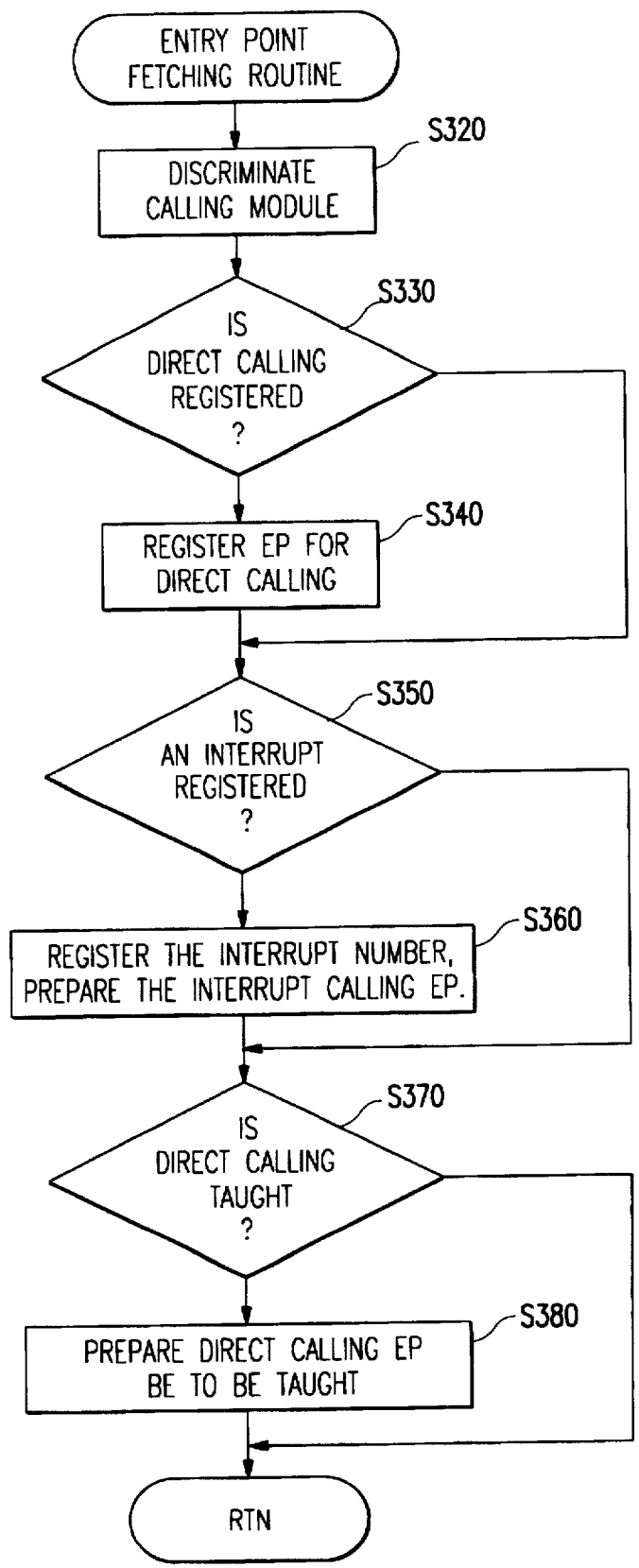
FIG. 11 shows a flowchart of the entry point fetching routine.
Figure 12:
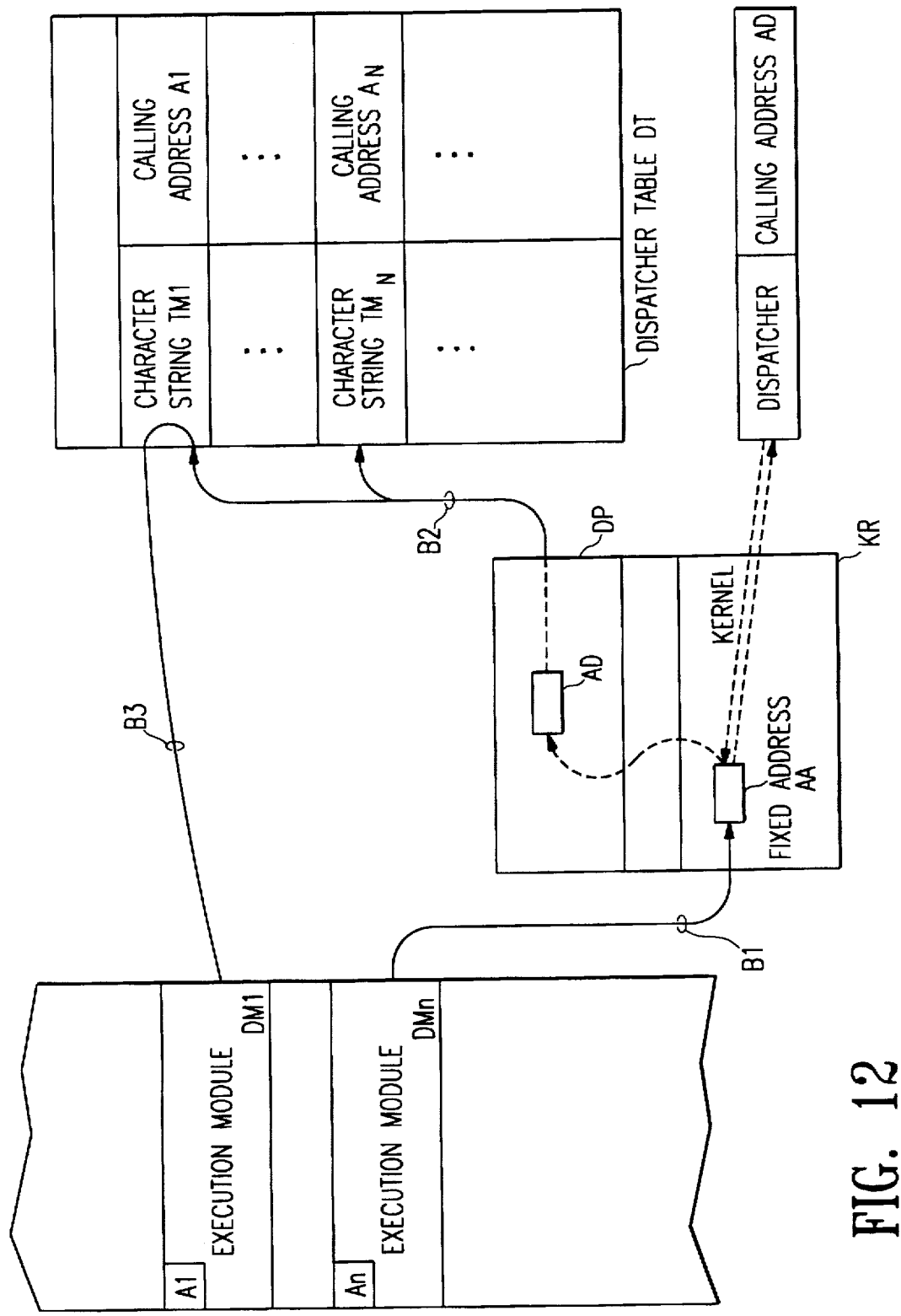
FIG. 12 shows a diagram of the features of calling address registration during an interrupt of an execution module.

These various execution modules are read from the hard disk 84 by the kernel KR and placed in memory during the initialization processing. Each execution module executes the loading process prepared in advance in the execution module once, when placed in memory during the initialization processing. The flowcharts in FIGS. 9–11 illustrate one example of the processing performed by the execution module at this time. In addition, the diagram in FIG. 12 illustrates features of the processing in FIG. 9. Next, this diagram is used to describe the processing while loading an execution module.

When moving to the loading process of an execution module (i.e., execution module DM1 in FIG. 12), first, the dispatcher DP references the dispatcher table DT prepared in a specific memory area (step S200), and performs processing to register the module name TM1 (8 letters) and its calling address A1 in that free area (step S210). These reference and registration processes will actually use the functions of the kernel KR and dispatcher DP, as shown in FIG. 12. That is, the address AA, where the kernel KR accepts services from each execution module DM, is prepared as a fixed address. Each execution module DM calls this address AA and requests the registration of the module name TM (character string) and its calling address A (reference number B1 in FIG. 12). Therefore, the kernel KR references the table registered in advance by the dispatcher DP itself and fetches the calling address of the dispatcher DP, and uses this address AD to request a service registered in the dispatcher DP. The request is received, and the dispatcher DP registers the name of the module TM (character string) and its calling address A in the dispatcher table DT (reference number B2 in FIG. 12).

The above method for requesting the various services in the dispatcher DP, via the fixed address AA in the kernel KR, is used when one of the execution modules calls another module, or when the entry point EP for direct calling, to be explained later, is registered for the module which is the communication partner. For example, when one of the execution modules calls another execution module, the service for calling an execution module is requested by the dispatcher DP, via the fixed address AA of the kernel KR. The dispatcher DP easily obtains the calling address of the module that will be called by referencing the dispatcher table DT and can call this module (reference number B3 in FIG. 12). Consequently, only the fixed address AA of the kernel KR must be managed in advance by the kernel KR, dispatcher table DT, and various execution modules. This simplified management is advantageous.

Next, at step S220 it is determined whether the intermodule communication in the execution module DM1 is registered. The execution modules are registered in sequence according to the contents of the registration file. For example, after the nth execution module DMn is activated and the registrations of the module name TMn itself and the calling address An are complete (reference number B2 in FIG. 12), the decision on intermodule communication (step S220) is made. At step S230 the entry point EP for direct calling prepared in the execution module DMn is prepared as the parameter. This entry point EP is the direct calling address that is sent to the execution module which will be the target of intermodule communication. If there is no entry point to be sent, zero entry points EP are prepared. If there are multiple entry points, that number of entry points EP are prepared. To maintain high speed in the emulation, instead of calling the entire module using the calling address An in modules having a close relationship, it is sometimes preferred to directly call the process that includes a portion of the functions implemented by this module. In this case, each execution module must send the entry point EP to the module that is the target.

Figure 13:
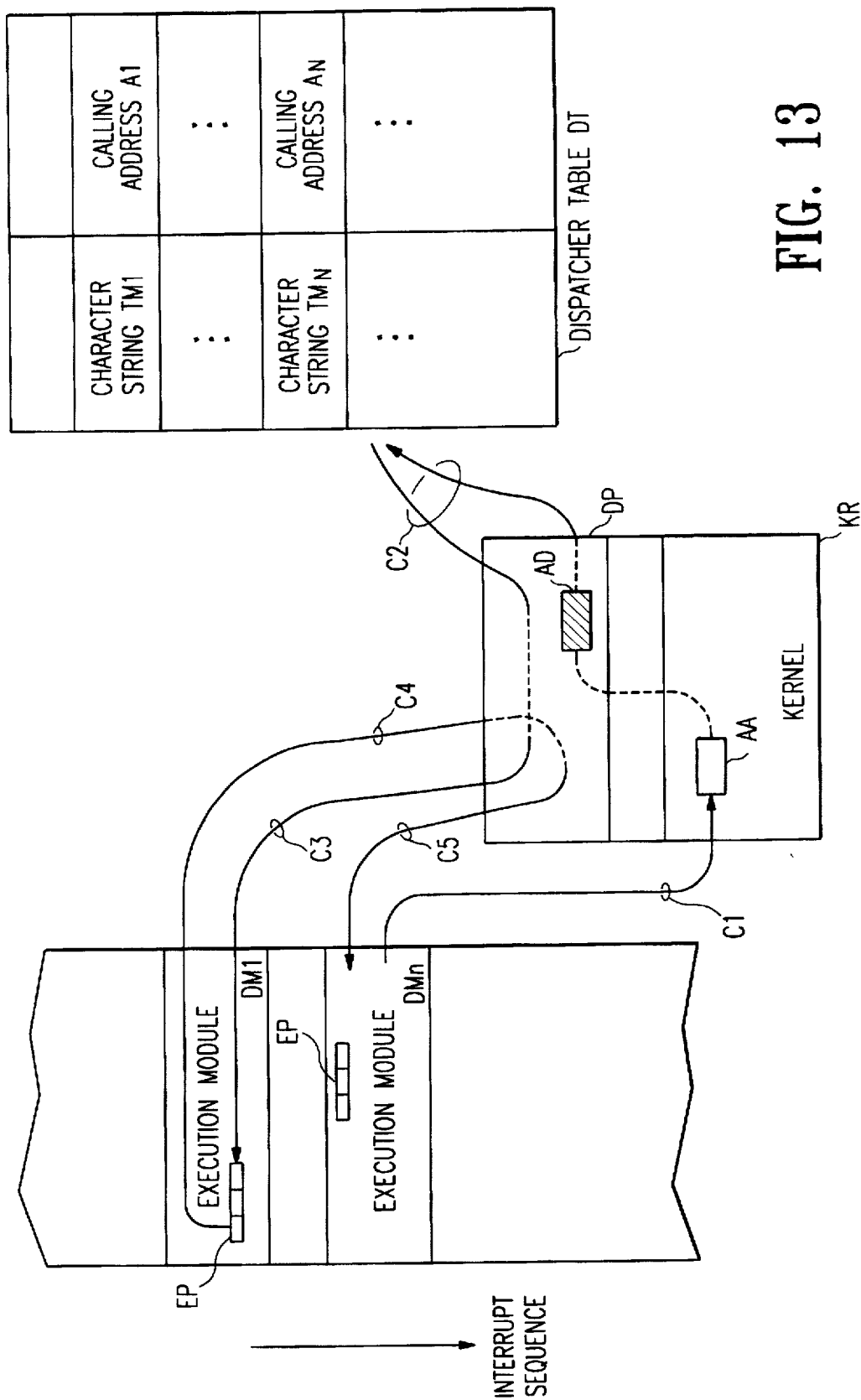
FIG. 13 shows a diagram of the features of calling another execution module while an execution module is being registered.

After preparing the entry point EP, at step 240 it is determined whether an interrupt is registered. If there is a registered interrupt, the registered interrupt number is prepared (step S250). If the execution module being loaded is using an interrupt, a corresponding number is prepared since the number of that interrupt must be registered in advance in the interrupt controller emulator IRM which is the module that emulates interrupts. After the above processing, calling of the execution module that is the communication target is requested by the dispatcher DP via the kernel KR (step S260, reference number C1 in FIG. 13). At this time, the execution module sets the name (character string) of the module being called, and transfers the prepared entry point EP for direct calling or the registration number of the interrupt as the parameter to the dispatcher DP.

The dispatcher DP that received this request executes the dispatcher calling routine shown in FIG. 10. The dispatcher DP references the dispatcher table DT for this character string because the name (character string) of the module that should be called will be accepted (step S300, reference number C2 in FIG. 13). DP fetches the calling address, and calls the module routine (step S310, reference number C3 in FIG. 13). At this time, the dispatcher DP transfers the parameter received from the calling module to the called module.

By calling from this dispatcher DP, the execution module that should be the communication target is called. This execution module executes the process where the entry point, shown in FIG. 11, is fetched. When this process starts, it is determined whether there is a called module is first determined at step S320. When the called execution module prepares an entry point EP for direct calling as the parameter is determined at step S330. Then, the direct calling entry point EP is registered at step S340.

Next, the module executing the process in FIG. 11 determines whether an interrupt is registered for the interrupt controller emulator IRM (step S350). When an interrupt number is registered, the received interrupt number is registered as one of the parameters and preparations are made to send the entry point EP for direct calling by an interrupt to the module on the interrupt side (step S360). Since the module registering the interrupt number is limited to the interrupt controller emulator IRM, when the process in FIG. 11 occurs in other modules, the processes in steps S350 and S360 are not performed.

Following the processing related to interrupt registration, at step 370 it is determined whether the module on the called side is a module where there is an entry point EP for sending direct calling other than the entry point EP for interrupt calling. When it has been determined that the direct calling entry point EP must be sent to the module on the called side, the direct calling entry point EP to be sent is prepared as the return value parameter (step S380). After the above processing, this routine jumps to [RTN] and ends. The result is that the process returns to the execution module on the called side (C5 in FIG. 13) via the dispatcher DP (C4 in FIG. 13). In this case, if a parameter is prepared as the return value of the execution module on the side that was called, this parameter is returned to the execution module on the called side. The execution module on the called side registers this parameter as the entry point EP.

The initialization process ends by repeating the above process until the last execution module is loaded. Then, the execution mode switches to the virtual 86 mode and starts the process that boots MS-DOS, which is the operating system as the PC-9800 machine. Specifically, system files like MSDOS.SYS and IO.SYS are read in, COMMAND-.COM is loaded, and the device drivers registered in CONFIG.SYS are loaded. Since these processes are identical to the loading processes in ordinary MS-DOS and the CPU switches to the virtual 86 mode, the PC-9800 machine does not differ from the MS-DOS loading process. Even when a DOS/V machine boots MS-DOS in the original state, files with the same names, such as MSDOS.SYS, are read in, but these files naturally have different contents. Since these files are generally set to be placed on the root directory, multiple copies of files having the same names but different contents are not allowed. Consequently, a special application program is executed before starting the emulation to change the names of files such as MSDOS.SYS for one machine.

Although the execution module must register at least its own module name TM (character string) and the calling address A during loading in the dispatcher table DT, for an execution module using memory, the necessary real memory is allocated to virtual memory (memory space for 98) which was reserved for use by the PC-9800 machine.

Based on the above processing, the environment that emulates the target machine (PC-9800 machine in this embodiment) on the execution machine (DOS/V machine in this embodiment) is provided. Therefore, while referring to FIG. 1, features of the actual emulation are broadly described. An example of further processing performed by the execution module is described in detail.

When initialization ends, each system file for the PC-9800 is read in, MS-DOS is booted, and the state is entered where a prompt, such as "A:" is displayed on the CRT 76. In this state, MS-DOS runs but when a specific application is initiated and its executable file name is entered from the keyboard 72, the keyboard emulation is executed. The "virtual PC programs" shown in FIG. 1 are all of the programs containing DOS and not comprised of only application programs. At this time, the DOS/V machine is operating in the protected mode, and the ring protection function provided by the CPU 21 has privilege level 3. This state, where the application program APP is loaded in the memory space for the 98 prepared virtually and an application program is executed on the virtual PC is accepted, and the operation of the emulator will be described.

The following five events may occur when starting an emulation (1) Page fault (accessing an area where memory is not allocated)

(2) General exception (executing a privileged instruction, executing an I/O read or write, or a write instruction to write-protected memory, accessing an area outside the specified address range, etc.)

(3) Error (division by 0, etc.)

(4) Stack operation (5) Hardware interrupt

If these events occur, the kernel KR is initiated. Since all of the register values are saved at this time, the kernel KR can examine the cause of its initiation. The kernel determines when the accessed address or I/O, or what function the generated hardware interrupt corresponds to, and calls the dispatcher DP. As shown in FIG. 12, because the address to be called by the dispatcher DP is registered in the initialization process, the kernel KR can call the dispatcher DP from this calling address AD. After the process transmits to the driver, the privilege level is set to 0.

The dispatcher DP specifies the execution module to be called based on the information received from the kernel KR and fetches the execution module's calling address from the dispatcher table DT. The dispatcher DP uses this calling address to call each execution module. In FIG. 1, as explained earlier, the execution modules illustrated are the memory emulator MEM, mouse emulator MUM, graphics emulator GEM, text emulator TEM, character font emulator CFM, display emulator DEM, timer emulator TIM, keyboard emulator KEM, and interrupt controller emulator IRM.

In addition, various execution modules exist, such as a printer or emulator for controlling serial communication according to the RS-232C standard. When a hardware interrupt is generated and the application program APP executes a privileged instruction, processing moves to the kernel KR. The kernel KR examines the privileged instruction and the specifics of the hardware interrupt, and calls the dispatcher DP. The dispatcher DP accepts the contents that should be emulated from the kernel KR, references the dispatcher table DT, and uses the calling address A to call the required execution module. When the called execution module can execute all of its own processes, they are executed unaltered. When the processes of another execution module are needed, the entry point EP obtained in advance during the initialization process is used, and the execution module is directly called. This is called intermodule communication.

Figure 14:
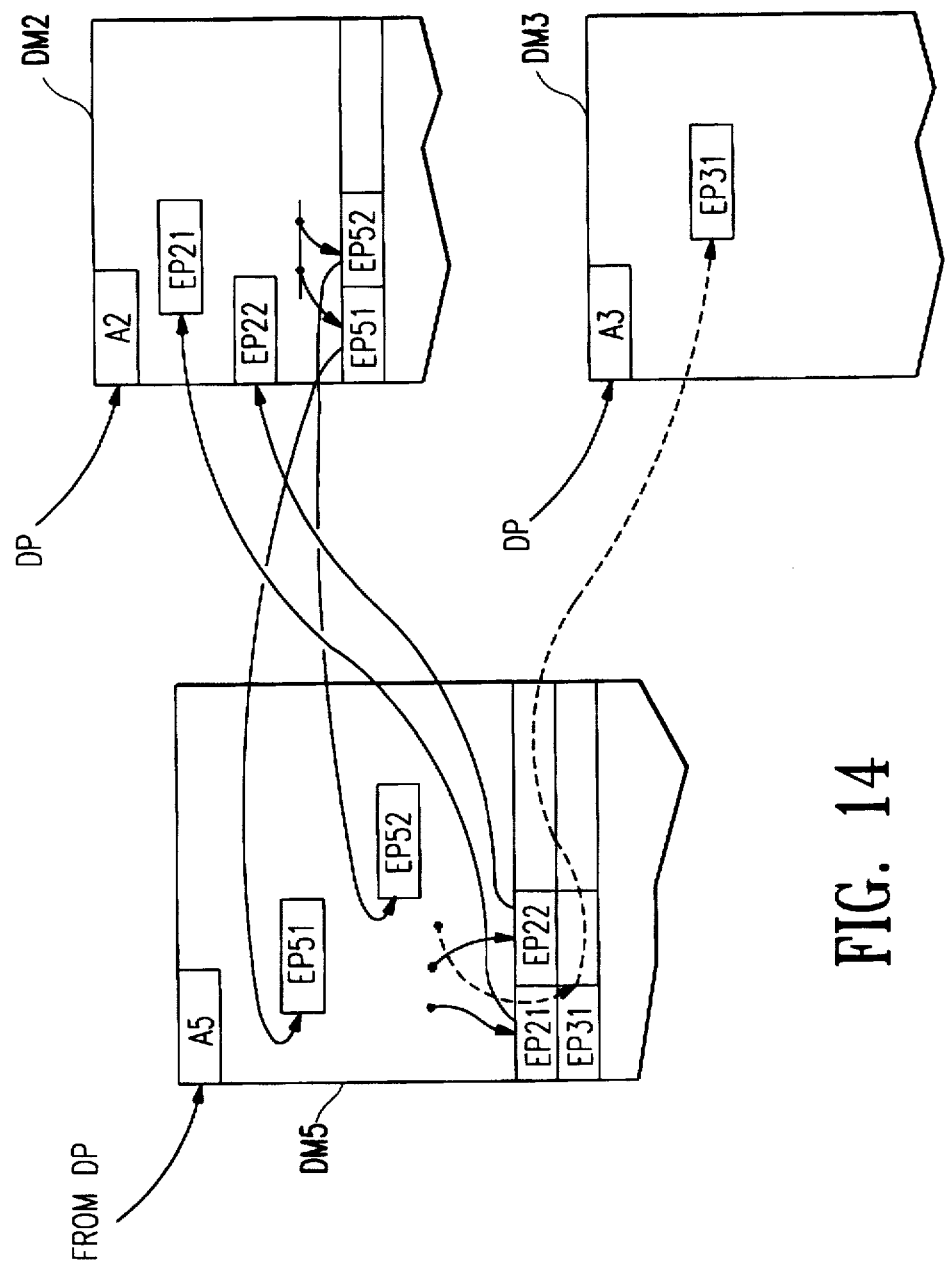
FIG. 14 shows a diagram of the features of direct calling between execution modules (intermodule communication).

FIG. 14 is a diagram showing an example of an ordinary execution module call and intermodule communication. In the example shown in FIG. 14, the intermodule communication is performed between the execution modules DM2, DM3, and DM5. As shown, when called from the dispatcher DP, the starting addresses of all of the modules, such as the calling addresses A2, A3, and A5, are called. During intermodule communication, however, the entry points EP which were sent and fetched by one side, or mutually in the initialization process are used. An internal process of a module is directly called from the processes in each execution module when needed. For example, when the need arises to directly execute an internal process in the execution module DM2 in an internal process of execution module DM5, the entry point EP21 is referenced. The internal process in the direct execution module DM2 is called and executed (reference number C21). Even in a method calling another execution module via the dispatcher DP, if the parameter indicating the service needed by the module to be called can be transferred, each of the processes prepared by the other execution modules can be used. However, procedures are required to request service to the dispatcher DP, reference the dispatcher table DT from the dispatcher DP, and call based on the calling address A. Compared to this process, intermodule communication has the advantage of being able to execute processing necessary at extremely high speeds because the required process is called directly.

After a process for executing an application program APP is emulated by each execution module DM, sequential processing returns to the application program APP from the kernel KR. When the interrupt controller emulator IRM is called by a hardware interrupt, or when the interrupt controller emulator IRM is called from the process of another execution module, the interrupt controller emulator IRM generates a virtual interrupt to the kernel KR to emulate the generation of the interrupt in the PC-9800 machine. The kernel KR is called by this virtual interrupt. The kernel KR evaluates this virtual interrupt and calls the required execution modules again. Depending on the situation, the system returns to the application program.

Figure 15:
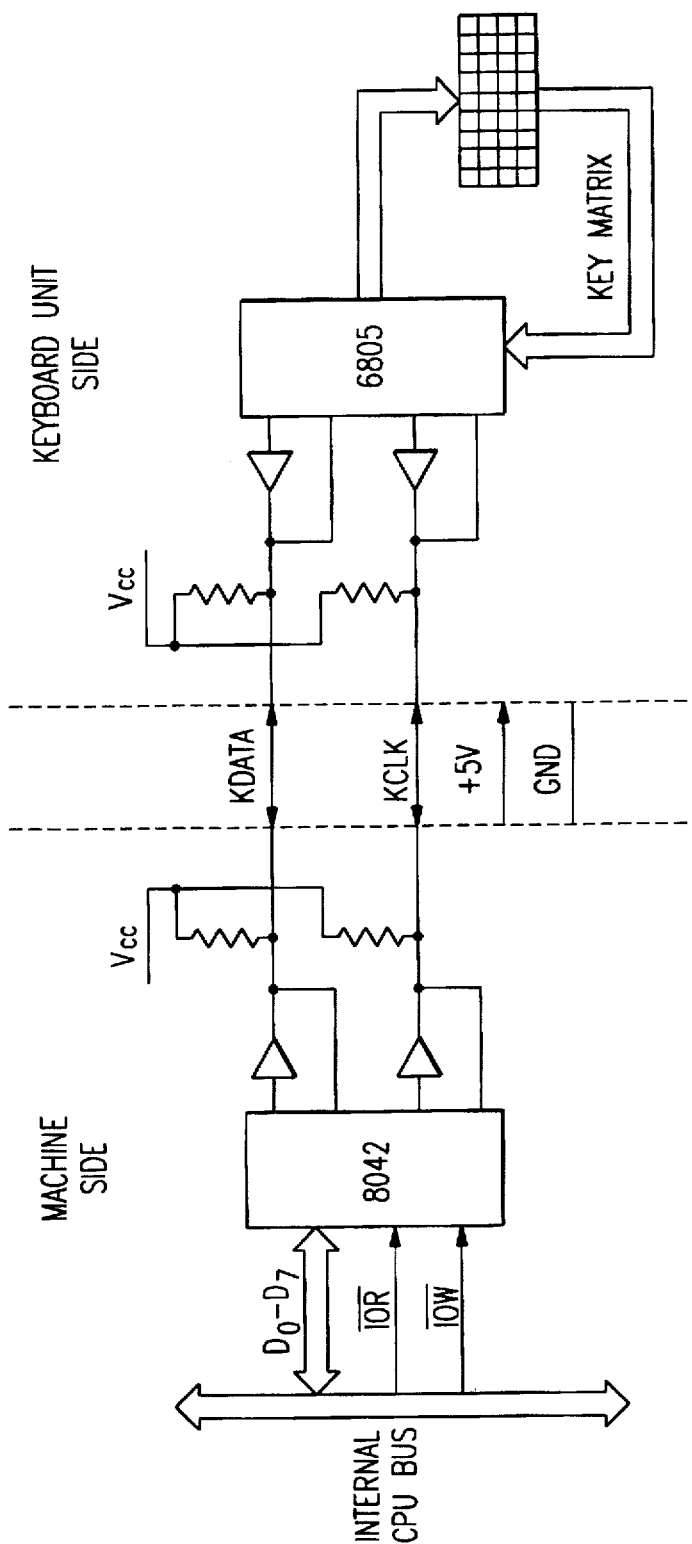
FIG. 15 shows a block diagram of the keyboard peripheral circuit in the DOS/V machine.
Figure 16:
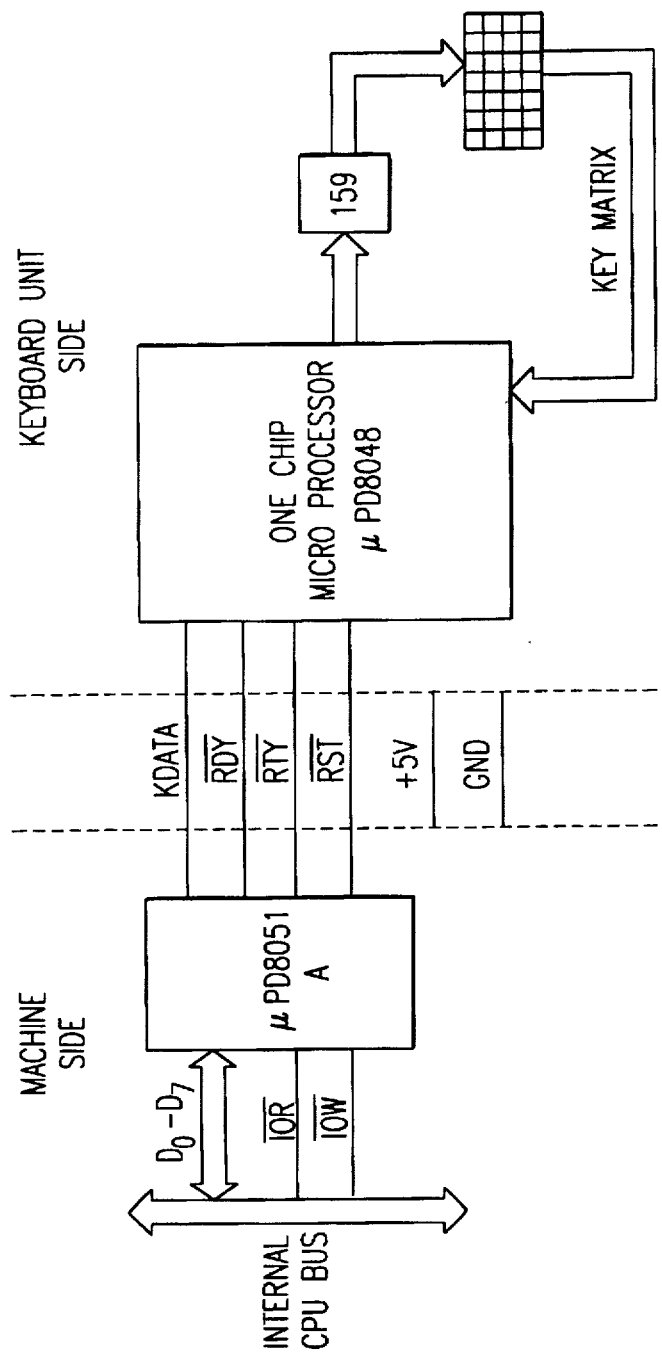
FIG. 16 shows a block diagram of the keyboard peripheral circuit in the PC-9800 machine.

Next, as an example of the emulation of each function of the PC-9800 actually performed on the DOS/V machine, the input emulation from the keyboard 72 is explained in detail. FIG. 15 shows the structures of the DOS/V machine's keyboard 72 and its interface, KEY 64. In addition, the circuit of the PC-9800 machine is depicted in FIG. 16. As observed in both figures, a one-chip microprocessor reads the key matrix in the DOS/V machine. Synchronous communication of this data by clocking synchronous to the KEY 64 side is the mechanism used for communicating with the CPU 21 side. In contrast, the PC-9800 machine adopts the structure where the key matrix is read by the one-chip microprocessor and a mechanism for conducting synchronous communication with the machine side. While not shown, the number of keys on the keyboard 72 itself differs. Furthermore, the mechanisms for generating the key code when the same key is continuously pressed differs.

Figure 17:
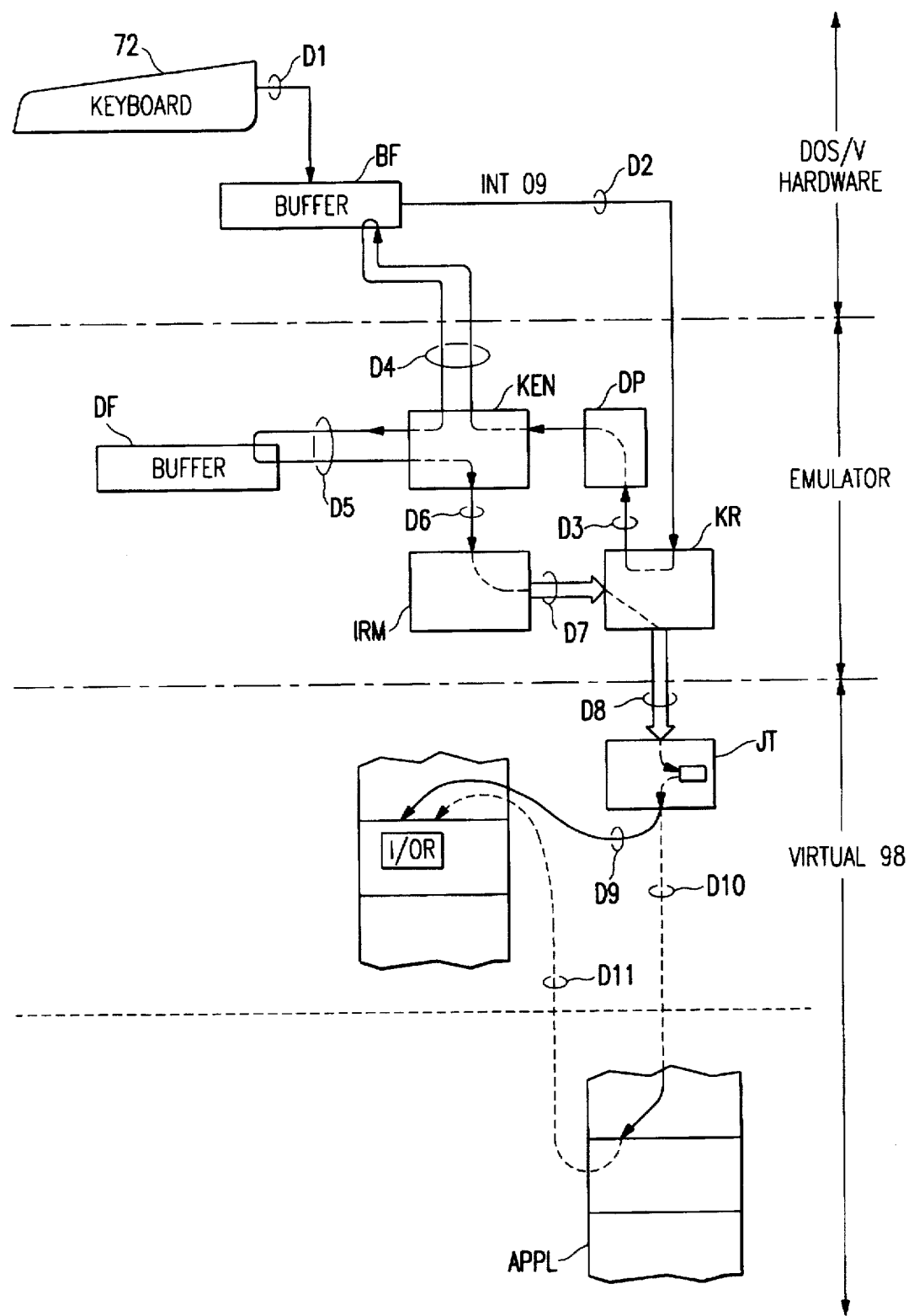
FIG. 17 shows a diagram of the features of emulating the input from the keyboard in an emulator of the embodiment.
Figure 18:
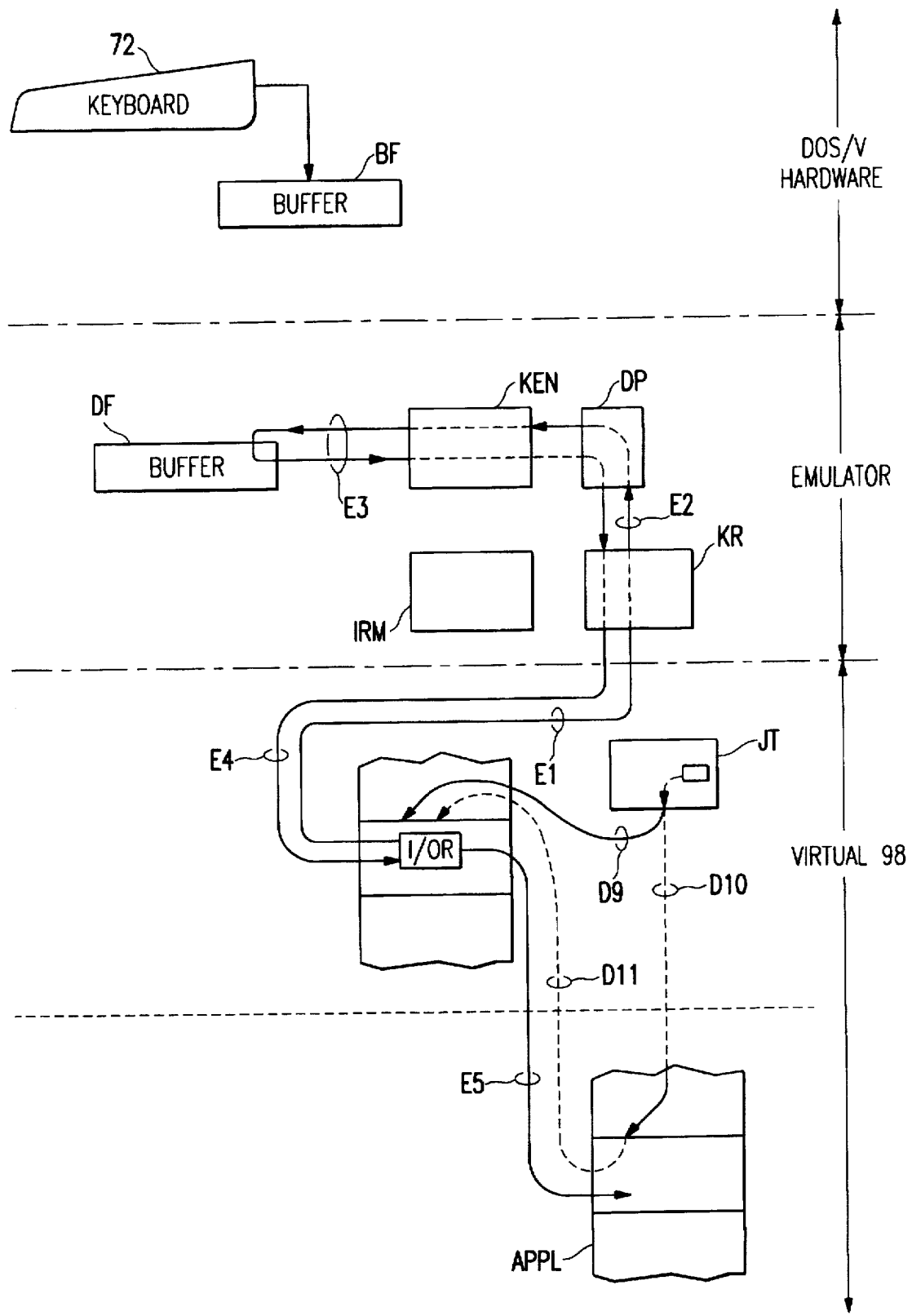
FIG. 18 shows a diagram of the features in the last half of the input emulation from the same keyboard.

FIGS. 17 and 18 are diagrams illustrating aspects of input from the keyboard 72 being emulated as the input from the keyboard of a PC-9800 machine. The diagrams are divided into levels and illustrate the DOS/V machine hardware at the top, followed by the execution unit of the emulation, and then the virtual 98. The virtual 98 is a virtual memory space prepared for the PC-9800 of which the task itself enables processing to be performed as if it was being done in a real space of the PC-9800 machine that is prepared similar to MS-DOS as the task itself. However, since the CPU 21 at this time operates in the protected mode, when the application program APP in virtual 98 executes instructions, the task is immediately switched as exception handling and moves to processing by the kernel KR.

When a key on the keyboard 72 is operated during the execution of the application program APP, the key code from the keyboard 72 is stored in the buffer BF (reference number D1 in FIG. 17) and simultaneously generates an interrupt in the hardware (INT 09). This interrupt request immediately moves the process to the kernel KR (reference number D2). As described previously, the kernel KR analyzes the hardware interrupt and transfers the process to the dispatcher DP (reference number D3). The dispatcher DP uses the calling address, registered during the initialization process, to call the keyboard emulator KEM.

The keyboard emulator KEM reads the key code stored in the buffer BF. This code determines whether it can be converted into a key code for the PC-9800 machine. The two cases do not have a complete one-to-one correspondence. In particular, in the DOS/V machine, a second key code is provided and is uniquely determined initially. Consequently, for this key code, the generation of the key code for the PC-9800 machine is not performed. The system returns to the state where an interrupt is generated from the keyboard 72 via the dispatcher DP and kernel KR (reference number D8). When it is decided that the key code for the PC-9800 machine can be generated, the keyboard emulator KEM stores the converted key code in the buffer DF, that it controls (reference number D5), and then performs the process that directly calls the interrupt controller emulator IRM by intermodule communication (reference number D6).

As shown in FIGS. 9–14, during loading in the initialization process, each execution module fetches the opposing entry points EP for performing intermodule communication. The keyboard emulator KEM also fetches the entry point EP that directly calls the interrupt controller emulator IRM and completes the registration of the interrupt number. Therefore, the interrupt controller emulator IRM is directly called from the keyboard emulator KEM. The interrupt generation from the keyboard 72 of an interrupt is transferred to the interrupt controller emulator IRM.

The interrupt controller emulator IRM receives this intermodule communication, analyzes the interrupt contents, and generates the virtual interrupt required by the kernel KR (reference number D7). The kernel KR accepts this virtual interrupt request and analyzes it. If the application program APP accepts the key input from the keyboard 72 by interrupt handling, the kernel references the jump table JT (reference number D8). When the PC-9800 machine accepts an interrupt from the keyboard 72, the jump destination is obtained and moves to the required processing routine (reference number D9). If the application program APP does not depend on an interrupt request from the keyboard 72, but periodically scans for key input on its own, the process returns temporarily to the application program APP level (reference number D10). In this case, at every fixed time interval, the routine for reading the key code from the keyboard 72 is called (reference number D11). At this time, the privilege level of CPU 21 is returned to 3.

FIG. 18 is referred to in order to explain the process after calling the process that reads the key code in this virtual 98. The process that reads the key code executes the I/O instruction for reading key data allocated at the specified I/O address of the PC-9800 machine. This I/O instruction is trapped as exception handling at privilege level 3 for each privileged instruction execution, and the processing moves to the kernel KR (reference number E1 in FIG. 18). The kernel KR analyzes the contents of this exception handling and calls the keyboard emulator KEM, via the dispatcher DP (reference number E2). The keyboard emulator KEM determines whether the processing follows an interrupt request, or follows reading the I/O by recognizing the parameter when called, and the contents of the buffer DF are read (reference number E3). Since the buffer DF saves the key code for the PC-9800 machine previously written by the keyboard emulator KEM, this buffer can easily be read by the same keyboard emulator KEM.

Since the above is not processed by a hardware interrupt, the keyboard emulator KEM returns the processing to the kernel KR via the dispatcher DP, and returns to the process where exception handling occurred (reference number E4). The result is that the processing is performed on the PC-9800 that inputs key data from the keyboard 72. This data is transmitted to the application program APP. The application program APP for the PC-9800 developed on the virtual 98 continues the same processing as the case when there is key input from the keyboard 72 of the PC-9800 machine. The emulator of this embodiment completely emulates the hardware of the PC-9800 and its operation.

In the above example, input from the keyboard 72 was used. The structure and operation of the emulator of this embodiment were explained, however the other execution modules also have almost identical operations. For example, the mouse emulator MUM, that emulates the operation of the mouse 73, is constructed as follows. This mouse of the PC-9800 machine generates interrupts at specified intervals, and transfers the absolute value from the origin position as data for the CPU. In contrast, the difference in the DOS/V machine is that the mouse 73 generates the interrupt when the mouse 73 is moved. Moreover, the change in data (Δx, Δy) from the previous position and data composed of the on/off information of the mouse buttons are transferred. Therefore, the mouse emulator MUM that emulates this is called once by the hardware interrupt generated when the mouse 73 is moved. The difference data (Δx, Δy) that was read, and the current absolute position of the mouse from the previous mouse position, are computed and stored in the specified buffer. In addition, the mouse emulator MUM is requested so that an interrupt in generated at each specified time in the preset timer emulator TIM. An interrupt is generated for the interrupt controller emulator IRM at a specified time interval from the timer interval TIM. The interrupt controller emulator IRM that accepted this interrupt, recognizes the interrupt for the mouse of the PC-9800 machine and generates a virtual interrupt to the kernel KR. The kernel KR calls MUM again by the virtual interrupt. The mouse emulator MUM calls the absolute position of the mouse, calculated in response to this call from the buffer, and returns the information. The result is that the application program APP can accept the absolute position data from the mouse at specified time intervals.

The keyboard emulator KEM and mouse emulator MUM, described above, both use hardware interrupts. However, in a module that does not use interrupts, the process is performed in the procedure of generating exception handling, calling the execution module through the dispatcher DP from the kernel KR, emulating in each execution module (intermodule communication if needed), and returning to the application program with the parameters after processing.

According to the emulator of this embodiment described above, the program that emulates the target machine on the execution machine is hierarchical with a kernel KR, dispatcher DP, and each execution module, and has great advantages. Consequently, a large program emulating a large function can be efficiently developed. Moreover, since each execution module is modularized close to the hardware function, even within an application program APP directly accessing the hardware, the emulation can be performed correctly. For example, in the emulation of the keyboard as explained in detail, the keyboard emulator KEM is called twice until the input is transferred to the application program APP when input from the keyboard 72 occurs. Since the entire input from the keyboard 72 is not combined and emulated, temporary virtual interrupts are generated and the process of generating an interrupt accompanying input from the keyboard in the PC-9800 machine is emulated. The result is that the application program APP uses the BIOS and fetches a character string from the keyboard. Therefore, until the application program APP itself analyzes the key codes, the emulation for all typing processes can function normally. As a result, compatibility based on the emulation is further improved.

When this module structure is adopted, the number of modules usually increases and their management becomes complex. In this embodiment, during initialization processing, since the execution module itself registers the module name and the calling address when loaded in the dispatcher table DT, the managing, converting, and updating of multiple modules become very easy. Since the allocation of the dispatcher table is not fixed and is suitably registered in the registration order, when a new execution module is prepared and the registration order is changed, special processes are not required.

When the structure adopted has one function implemented by multiple modules, overhead is created in calls between the modules, slowing execution. Such a decrease in the overall execution speed of the application program APP operated in the emulation that may not be tolerable in practice. In this embodiment, in addition to a normal call of each execution module, each execution module can directly call the processes of another module by using intermodule communication. Therefore, multiple modules are not called by the dispatcher DP. The results of executing a direct process by intermodule communication are that the creation of the overhead accompanying execution module calls can be decreased and high-speed emulation can be implemented. Moreover, the entry point EP for intermodule communication is received while the module is conducting intermodule communication during loading. Thus, even when multiple modules are involved in this function, the advantage obtained is that the management of the entry point EP in each module in high-speed execution is simple. Furthermore, the entry points EP of the execution modules loaded before is not only fetched, but the entry points EP of the modules loaded later in the module loaded previously can be sent. Therefore, calls between modules unrelated to the loading order can be performed.

Furthermore, in this embodiment, since the embodiment using interrupt handling notifies the interrupt controller emulator IRM of the interrupt number in advance, the cause of the interrupt can be rapidly specified for the signaling of an interrupt generation. Then, the interrupt controller emulator IRM can perform the required processing.

An embodiment of the present invention has been described. However the present invention is in no way limited to this embodiment and naturally includes; implementations in various states within a range that does not omit the essential elements of the present invention. For example, when a high-speed CPU having a RISC structure and memory provided in the PCI bridge 30, exception handling is performed and a trap is generated. The processing is transmitted to the CPU in the PCI bridge 30 and the processing in each execution module for the emulation, shown in FIG. 1, can implement a structure with a different CPU than CPU 21. In addition, at least one execution module unit or a portion formed by the execution modules is not hindered as an implementation in hardware. When the CPU operating speed in the execution machine is not increased by very much, even when using intermodule communication in an execution module required to repeatedly call an execution module, that by emulation is thought to be lower compared to the operating speed in the target machine. In this execution module, accurately implementing the functions of the target machine by using hardware contributes dramatically to improving the operating speed.

In the aforementioned embodiment, the structure implementing the PC-9800 machine on a DOS/V machine was presented and explained in the example. However, a DOS/V machine on a PC-9800 machine is also easily implemented. Furthermore, this emulator can also be applied to other architectures.

The divisions of the execution modules shown in FIG. 1 are not limited to one example. The modules can be further divided and merged. For example, the keyboard emulator KEM can be constructed as two separate modules corresponding to the functions to be called, since there are two calls when an interrupt is generated by the keyboard 72, and when a virtual interrupt is generated by the interrupt controller emulator IRM.

In the emulator of the embodiment described above, a process belonging to a process related to the target machine is executed as an equivalent process by the execution modules called by using the calling information registered in advance. Therefore, the target machine functions have the effect of being able to easily implement a structure to be emulated on an execution module. Since a module emulating each function in the target machine is usually provided, the number of modules increased and their management is complex. In the emulator of the present embodiment, since calling information for calling the execution module is registered when the execution machine is booted, managing, changing, and updating are simplified.

Registration of the calling information for calling the execution modules moves to temporary processing when executing a specific processing program prepared in the execution module. If the execution module registers the calling information and the initialization stage is organized to be performed in each execution module, the initialization stage does not need to know information such as what calling information should be registered and which execution modules are registered. Its organization can be simple, and adding or changing the execution modules can become simplified as well.

At least one of the execution modules stores calling information registered by the other execution module. While the execution module is executing, if the calling information is used to indirectly call another execution module via the calling means (however, not calling the detection means or discrimination means), there is not necessarily any overhead due to the detection means, or discrimination means and the entire execution speed may be improved.

Furthermore, at least one of the execution modules is prepared in another module loaded before this execution module when the execution modules are loaded by the initialization means. If direct calling information for directly calling at least one of the processes formed by another said execution module is fetched, an execution module loaded later uses the fetched direct calling information while the execution module is executing and can directly call another execution module loaded previously by this execution module. Thus, increasing the speed of the embodiment process can be designed. In another execution module loaded previously, if direct calling information for directly calling at least one of the processes formed by this execution module is prepared in an execution module to be loaded later and sent, the execution module loaded previously directly calls the execution module loaded later. This possibility is an advantage.

At least one of the execution modules is a module for executing a process equivalent to the process accompanying an interrupt in the hardware of the target machine. When another execution module to which the above module sends direct calling information is a module for processing the originator of the interrupts, if this execution module registers information for specific interrupts for another execution module during registration, since an interrupt can be easily specified when the interrupt is generated, processing when an interrupt is generated is simplified.

This execution module is not completely constructed from software and at least the execution modules and calling means of a portion of the multiple execution modules are loaded on the execution machine. If implemented on the machine provided with an arithmetic processing unit different from the arithmetic processing unit of the execution machine, the execution speed of the emulation can be improved If the module executing a process equivalent to the input and/or output of data on the I/O device is constructed to be called twice when called in conjunction with the operation of the I/O device of the execution machine and when called by an interrupt generated by simulating the I/O of data between the I/O device for the target machine, the I/O device functions can be :simulated with better accuracy, and the compatibility of the emulator can be further improved.

What is claimed is:

1. An emulator hosted on an execution machine to execute programs of a target machine, the execution machine having an architecture and including a computer equipped with at least an input/output (I/O) unit, a memory unit, and a processing unit, the processing unit having an instruction set, the target machine including a computer having an architecture that differs from the architecture of said execution machine, the emulator comprising:

a plurality of execution modules capable of performing on said execution machine functions equivalent to functions of the architecture of said target machine;

a detector for detecting when a program requires performing functions of said target machine when said program is executed on said execution machine;

a function identifier for identifying the functions of the target required by the program when the detector detects that the program requires performing functions of the target machine; and logic for calling said execution modules prepared for each of the equivalent functions corresponding to the identified functions, wherein at least one of the execution modules is capable of executing a process equivalent to data input and/or output with a specific I/O device of the target machine, the at least one of the execution modules comprising:

logic for transmitting data between said I/O device and the at least one execution module, said logic for transmitting data being called in conjunction with the operation of the I/O device of the execution machine; and logic for exchanging data in response to an interrupt that is generated when the input and output of data from the I/O device for said target machine is simulated after transmitting said data, wherein the transmitted data acts as the data of the I/O device in said target machine, and the at least one execution module is called twice when operating the I/O device of the execution machine.

2. The emulator of claim 1, wherein at least one of the plurality of execution modules further includes:
   storing logic for storing calling information representative of at least one entry point address registered by another execution module; and
   logic for calling the another execution module indirectly by using the calling information stored by said storing logic when said at least one execution module is executing.

3. The emulator of claim 1, wherein at least one execution module further includes:
   a section for retrieving direct calling information to be used for directly calling at least one of the processes prepared inside another execution module which is preloaded, wherein the another module is formed when the plurality of execution modules are loaded; and
   logic for directly calling said process internal to the second execution module by using the direct calling information during the execution of the at least one execution module.

4. The emulator of claim 1, wherein at least a first execution module includes calling information logic for indicating direct calling information to a second execution module, the direct calling information enabling the calling of at least one of the processes that forms said first execution module, the second execution module being loaded prior to the loading of the first execution module, the second execution module including logic for calling said first execution module by using said direct calling information.

5. The emulator of claim 4, the emulator further including at least one execution module having interrupt information registration logic for registering specific information to identify interrupts to another execution module, said at least one execution module being a module for executing a process equivalent to the process accompanying an interrupt in the hardware of said target machine, said another execution module being a module for processing said interrupt.

6. The emulator of claim 1, wherein at least one of the execution modules is a module for executing a process equivalent to data I/O with the keyboard of the target machine and buffers data transmitted to and from said keyboard.

7. The emulator of claim 1, wherein at least one of the execution modules is a module for executing a process equivalent to data I/O with the mouse of the target machine and buffers data transmitted to and from said mouse.

8. The emulator of claim 1, wherein the detector generates one of an interrupt and a trap upon detecting the requirement for performing functions of said target machine.

9. The emulator of claim 1, the emulator further including an initializer for loading the plurality of execution modules and registering calling information in a memory for calling said execution modules before activating the emulation, wherein the logic for calling said execution modules calls said execution modules based upon said registered calling information.

10. The emulator of claim 9, wherein the initializer implements the registration of calling information for calling the execution modules by executing a specific processing program prepared for each of said execution modules.

11. A method of emulating peripheral function programs of a target machine on an execution machine, the execution machine having an architecture and including a computer equipped with at least an input/output (I/O) unit, a memory unit, and a processing unit, the processing unit having an instruction set, the target machine including a computer having an architecture that differs from the architecture of said execution machine, the method comprising:

loading to the execution machine a plurality of execution modules capable of performing functions equivalent to functions of the architecture of said target machine;
detecting when a program requires performing functions of said target machine when said program is executed on said execution machine;
identifying the functions of the target required by the program upon detection that the program requires performing functions of the target machine;
calling said execution modules prepared for each of the equivalent functions corresponding to the identified functions;
transmitting data between said I/O unit and at least one execution module, the at least one execution module being capable of executing a process equivalent to data input and/or output with a specific I/O device of the target machine, in conjunction with the operation of the I/O unit of the execution machine, wherein the transmitted data acts as the data of the I/O device in said target machine; and
calling the at least one execution module twice when operating the I/O unit of the execution machine.

12. The method of claim 11, the method further including:
storing, during the execution of a first execution module, calling information representative of at least one entry point address registered by a second execution module; and
calling the second execution module indirectly while said first execution module is executing by using the calling information stored by said storing step.

13. The method of claim 11, the method further including:
forming another execution module when the plurality of execution modules are loaded to the execution machine;
retrieving direct calling information to be used for directly calling at least one of the processes prepared inside the another execution module; and
directly calling said process internal to the another execution module by using the direct calling information during the execution of the at least one execution module.

14. The method of claim 11, the method further including:
loading a second execution module prior to loading a first execution module, the second execution module including logic for calling said first execution module by using direct calling information; and
transmitting the direct calling information to the second execution module, the direct calling information enabling the calling of at least one of the processes that forms said first execution module.

15. The method of claim 14, the method further including registering information identifying interrupt information of a first execution module to a second execution module, the first execution module being a module for executing a process equivalent to the process accompanying an interrupt in the hardware of said target machine, said second execution module being a module for processing said interrupt.

16. The method of claim 11, the method further including:
executing the at least one execution module to execute a process equivalent to data I/O with a keyboard of the target machine; and
buffering data transmitted to and from said keyboard.

17. The method of claim 11, the method further including:
executing the at least one execution module to execute a process equivalent to data I/O of a mouse driver of the target machine; and buffering data transmitted to and from said mouse driver.

18. The method of claim 11, the method further including generating one of an interrupt and a trap upon detecting the requirement for performing functions of said target machine.

19. The method of claim 11, the method further including:
registering calling information in a memory for calling said execution modules before activating the emulation; and calling said execution modules based upon said registered calling information.

20. The method of claim 19, the method further including registering calling information for calling the execution modules by executing a specific processing program prepared for each of said execution modules.

* * * * *